June 5, 1956     C. ORLANDO     2,748,649
METHOD AND MEANS FOR EVALUATING DENSITY CHARACTERISTICS
OF PHOTOGRAPHIC NEGATIVES
Filed Dec. 6, 1954

*INVENTOR.*
CARL ORLANDO
BY
*Harry M. Saragovitz*
ATTORNEY 2,748,649

METHOD AND MEANS FOR EVALUATING DENSITY CHARACTERISTICS OF PHOTOGRAPHIC NEGATIVES

Carl Orlando, Long Branch, N. J., assignor to the United States of America as represented by the Secretary of the Army Application December 6, 1954, Serial No. 473,493

7 Claims. (Cl. 88—14)

(Granted under Title 35, U. S. Code (1952), sec. 266)

The invention described herein may be manufactured and used by or for the Government for governmental purposes without the payment of any royalty thereon.

This invention relates to an apparatus and method for evaluating the density characteristics of photographic negatives and particularly to such apparatus wherein the evaluation may be accomplished by direct observation of the negative.

The negative to be evaluated is placed upon a transparent or translucent supporting member having a source of illumination positioned to cause a portion of the light therefrom to be transmitted therethrough. Light from the light source is split into two beams in any suitable way such as by a beam splitter, one of the beams passing directly to the translucent support while the other beam is directed upon the outer face of the support upon which the negative is placed for observation.

In one of the beams a yellow filter is inserted and in the other a blue filter is inserted. The intensity of one of the beams is controlled by a pair of polarizing filters whose angular position is adjustable or by any suitable means. When viewing a negative, the observer concentrates upon a section thereof which he desires to evaluate. He then adjusts the light controlling means until there is a balance of light between that which is transmitted through the negative and that which is reflected from its face at which time the observer will see a pure green hue comprising equal portions of the yellow and blue light. At this time the adjusted position of the light controlling means will be a function of the density of the negative at the observed position. By making such observations at various points upon the negative the various characteristics thereof may be determined an example of which is its density range or contrast.

It is a primary object of the invention to provide an efficient and simplified device for evaluating density characteristics of photographic negatives.

A further object of the invention is to provide a negative analyzer which permits rapid reading and recording of negative characteristics.

A further object of the invention is to provide a negative analyzer the accuracy of which is completely stable and is independent of minor changes in the source of illumination since its single light source supplies all of the operating light energy.

A further object of the invention is to provide a negative analyzer in which all adjustments are made by observing the appearance of a true color which is a blend from two other color components thus avoiding excessive eye strain induced by conventional negative analyzing devices.

Other objects and features of the invention will more fully appear from the following description and will be particularly pointed out in the claims.

To provide a better understanding of the invention a particular embodiment thereof will be described and illustrated in the accompanying drawings in which Fig. 1 is a diagrammatic view illustrating a preferred embodiment of the device.

Figure 1:
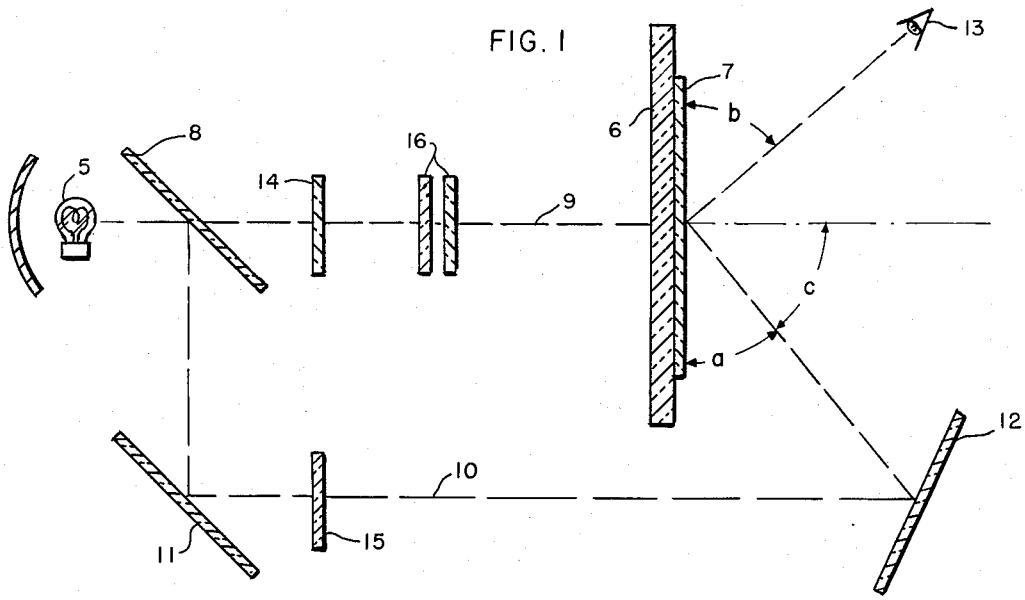

The apparatus illustrated in the drawings desirably would be inclosed in a light-tight casing of any suitable structure which is not shown. The light source 5 is spaced from and positioned to cast its light upon a plate 6 of sufficient area to receive the largest negative it is desired to analyze. Desirably, the plate 6 is at least partially diffusing but may be wholly transparent. In operation a negative 7 is placed in contact upon the side of the plate 6 remote from the light source. A convenient arrangement would be to mount the plate in a substantially horizontal position so that the negative may rest upon the plate in which case the light source would be placed below the plate.

Light from a source is split into two substantially equal beams. This may be done in any suitable manner such as by means of a partially silvered mirror 8 placed at an angle to the main light beam 9. The second light beam 10 split from the main beam is then given a double reflection by the angularly positioned mirrors 11 and 12. The mirror 12 is so disposed that light reflected therefrom will strike the outer surface of the negative 7 from which it is reflected to the eye 13 of the observer.

The beams 9 and 10 are filtered to obtain a selected narrow spectrum of desired hues which when combined will produce another hue which can be readily identified by the human eye. Any suitable combination of hues may be employed. In the embodiment herein presented a filter 14 is placed in the main beam 9 and acts to absorb all but the yellow rays which it transmits to the negative. A filter 15 is placed in the beam 10 and functions to absorb all but the blue light which it transmits to the front face of the negative.

Preferably, normal intensity of the two beams should be substantially equal. To provide the necessary adjustment to perform test measurement with the apparatus a means for controlling the intensity of at least one of the light beams is provided. Any suitable control may be used but should be neutral in color to avoid upsetting the color balance of the light beams. As shown herein a pair of light polarizing discs 16 are interposed in the main beam 9 although they may equally well be placed in the beam 10. Obviously, when the discs are rotated with respect to each other they will control the intensity of the light beam as a function of the relative position of their axes of polarization. The apparatus may be simplified by coloring one or both of the discs the same color as the filter of the beam in which it is placed thus eliminating one of the filters.

Figure 3:
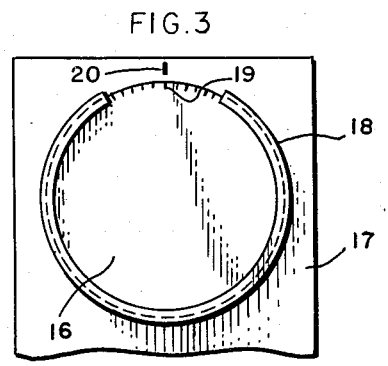
Fig. 3 illustrates a means for making readings from a scale calibrated directly in negative density units.

One of the polarizing screens, desirably, is fixed in a suitable support 17 as shown in Fig. 3 while the other is loosely mounted in a ring 18 fixed to the support 17 thus to permit one of the discs 16 to be rotated with respect to the other in the conventional manner. Desirably, the support 17 is provided with a reference mark 19 while the rotatable disc 16 is provided with a scale 20 to indicate the angular displacement of the axes of polarization of the discs 16. Desirably, the scale 20 is calibrated in density units.

The apparatus should first be properly calibrated for zero position. This can be accomplished by locating the zero position of the scale 20 upon the reference mark 19 when no negative is being analyzed. This corrected zero point is found by rotating the movable disc 16 until the supporting plate 6 appears to be a true green color which indicates an equal quantity of yellow light is passing through the support as compared to the quantity of blue light being reflected from the outer face thereof to the observer's eye. At this time the scale should read "zero."

To evaluate the negative it is placed upon the support 6. By so doing the intensity balance of the two beams 9 and 10 is upset. It must now be determined as to what characteristics of the negative it is desired to record. This apparatus is particularly useful in determining the density scale of a negative, or, in other words, its contrast. When this is found the operator may then be certain that he selects the correct grade of printing paper for the negative. To determine the negative contrast the observer must make two adjustments one for the minimum and one for the maximum density areas of the negative.

Assuming first the operator makes the minimum density reading in which case he will concentrate upon a portion of the negative having minimum density. He will then adjust the movable disc 16 until he observes a true green hue upon the area under observation. The position of the movable disc 16 is then noted and if the scale thereof is in density units he will then know the density of this portion of the negative. The observer then concentrates his attention upon an area of maximum density and the disc 16 is readjusted until he again observes a true green hue. This second position of the disc 16 indicates the maximum density of the negative. The difference between the maximum and minimum readings will then give the operator the density scale of the negative.

Figure 2:
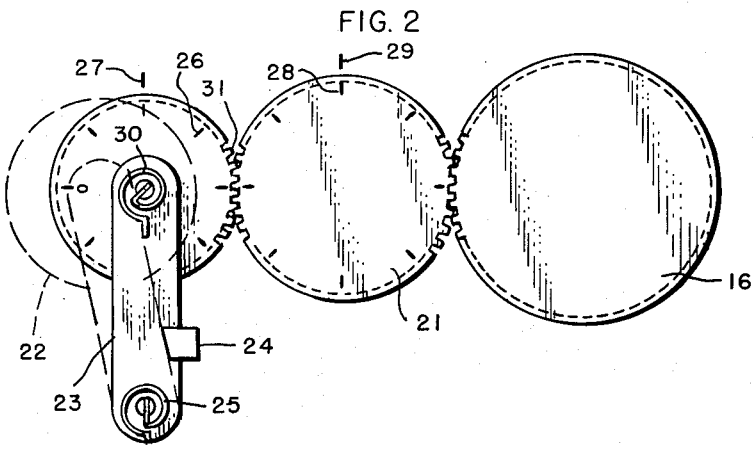
Fig. 2 illustrates a mechanism for indicating directly the contrast characteristic of a negative.

It may be desirable to provide means for indicating directly the density scale of the negative in contrast units as established by manufacturers of printing paper. A suitable means for accomplishing this result is to provide a rotating disc type computer one element of which is arranged to be manually coupled to or uncoupled from the rotating disc of the polarizing means. A desirable construction for such a device is shown in Fig. 2 of the drawings wherein the rotatable polarizing screen 16 is arranged to positively drive a wheel 21. This connection may be provided by intermeshing gear teeth upon their respective peripheries. The wheel 21 drives a third wheel 22 which may have frictional engagement therewith or may be provided with intermeshing gear teeth. Other means than gear teeth may be provided to establish the drive between the respective wheels. Such means may be an efficient friction drive.

The wheel 22 is arranged to be manually meshed with and disengaged from the wheel 21. A suitable means is shown wherein the wheel 22 is rotatably mounted upon one end of an arm 23, the other end of which is pivoted upon a fixed position at some stationary portion of the device thereby permitting the wheel 22 to be swung into mesh with the wheel 21. Means are also provided to hold the wheels 21 and 22 out of mesh. Such means may comprise a latch 24 which acts to hold the arm 23 in its dotted position as shown in Fig. 2. When the latch is released a spring 25 acts to move the arm and wheel into meshing position with the wheel 21. The computer functions as follows: The first adjustment to determine minimum density, as described above, is performed while the wheel 22 and its arm 23 are in the dotted position. Such action moves the wheel 21 into a position which is a function of the degree of rotation of the disc 16. The latch 24 is then actuated to release the arm 23 which causes the wheel 22 to intermesh with the wheel 21. The second adjustment of the rotating disc 16 is then performed which rotates the wheel 21 to a new position. At this time the wheel 22 also moves through an angle which is a function of the movement of the wheel 21 which took place during the second density measurement.

This second rotation of the wheel 21 also indicates the difference in angular displacement of the disc 16 between its first position and its second position and since these two positions represent maximum and minimum densities in the negative, the position of the wheel 22 with respect to its zero position is a function of the density scale of the negative which is also a measure of negative contrast. Thus, by calibrating the wheel 22 directly in printing paper contrast numbers such as is represented by the scale 26 a proper selection of paper can be made by reading the position of the wheel 22 with respect to a fixed reference point 27.

The wheel 21 may also be provided with a scale 28 which is calibrated in density units. Thus, maximum and minimum density values are made available by reading the position of the wheel 21 with respect to its fixed reference point 29. This information is valuable in determining printing exposure time or other required information about the negative.

When the operator has completed his analysis of a given negative he moves the arm 23 again into its dotted position where it is held by the latch 24. A spring 30 is connected to the shaft of the wheel 22 and acts to move it into a zero postion when it is free of engagement with the wheel 21. This zero position may be established as a position of the wheel when the stress in the spring 30 is of zero value.

An additional feature of the invention which adds to its accuracy is the careful positioning of the mirror 12 with respect to the support 6. The mirror should be so placed that the incident beam 10 will be directed upon the plate 6 at an angle $a$ with respect to a perpendicular to the plate 6. The observer should then direct his observations substantially along a line at an angle equal to the angle of reflection $b$ with respect to the negative.

It may be desirable to further increase the consistent accuracy of the device by taking into consideration the critical angle of refraction of the negative base material. By making the angle $c$ greater than the critical angle of refraction of the base material of the negative substantially all of the light incident upon the negative from the beam 10 will be reflected to the observer's eye. By using the angle $c$ light which enters the material will be reflected by total refraction at the bottom face of the negative and will combine with that reflected directly from its upper surface. Thus, inconsistencies in the results obtained due to varying degrees of absorption by negative base material at angles less than the critical angle are avoided.

What is claimed is:

1. A negative evaluating device comprising a light source, a beam splitter dividing light from said source into a first and second beam, a light transmitting plate for supporting a negative to be analyzed located in the path of one of said beams, an absorption filter intercepting each beam, said filters passing respectively colored light components which when combined in specific quantities will produce a substantially pure hue different from the hue of said components, means to direct the second beam upon the face of said plate away from said light source, means to adjust the relative intensity of said light beams and means connected with said adjusting means to indicate density characteristics of a negative placed on said plate.

2. A negative evaluating device comprising a light source, a beam splitter acting to divide light from said source into two beams, a light transmitting plate placed in position to transmit light from one of said beams and operable to support a negative to be analyzed whereby light will first pass through said plate and then through the negative, a plurality of mirrors acting to direct the other beam upon the outer face of a negative placed upon said plate, an absorption filter placed in each beam, said filters respectively passing colored light components which when combined in specific quantity will produce a true hue different from that of the said components, means to adjust the relative intensity of the light beams and means connected with said adjusting means to indicate quantities from which the contrast characteristic of the negative may be determined.

3. A negative evaluating device comprising a light source, a beam splitting means for dividing light from said source into two beams, a translucent plate placed in the path of one of said beams where light from said source will be transmitted first through said plate and then through a negative placed against the outer face thereof, light deflecting means placed in the path of said other light beam acting to direct it upon the outer face of said negative at an angle with respect to a perpendicular to the negative, a light filter in the path of each of said beams respectively transmitting colored ligh components which when combined will produce a substantially pure hue different from that of said components and means to control the intensity of light in said beams whereby the physical position of the light controlling means will assume positions indicative of density characteristics of the negative.

4. A negative evaluating device according to claim 3 wherein the incident light upon the outer face of the negative is directed at an agle with respect to a perpendicular from the negative which is greater than the critical angle of refraction of the negative base material.

5. A densitometer comprising a light source, means to provide two separate beams from said light source, means to direct the light from one beam thru a member to be evaluated, means to direct the light from the other beam upon the face of said member opposite to that receiving light from said other beam, filters in each beam passing colored light components which when combined in specific quantities will create a substantially pure hue of a color different from the colors passed by said filters, and means to adjust the relative intensity of light in each beam whereby when a pure hue composed of transmitted light from said first beam and reflected light from said second beam is observed the adjustment of said light adjusting means will indicate the density value of the observed area.

6. A densitometer comprising a light source, means for providing a first and second light beam from said source, a light transmitting support for a member to be evaluated, said support being located in the path of one of said beams, colored filters in the path of both beams, said filters passing respectively colored light components which when combined will produce a substantially pure hue different from that of the components, means to direct the second beam upon the face of the negative opposite to its face receiving incident light of the first beam, means to adjust the relative intensities of said light beams and indicating means associated with said light adjusting means to display density characteristics of the member.

7. A method of evaluating density characteristics of an element comprising filtering a first and second portion of the light from a light source to absorb respectively all but the light of a narrow spectrum of different hues, directing the filtered light of the first portion of light upon one face of said element to pass thru said element, reflecting the second portion of filtered light from the surface of said member opposite to its surface receiving incident light from said first portion of light and adjusting the relative intensities of the two portions of light until a true hue equal to the combined hues of the first and second portions of light is seen upon an area of the negative to be evaluated whereby the relative degree of adjustment of intensity of light in the two portions of light will indicate the density of one or more areas in the element from which to evaluate various density characteristics of the element.

No references cited.